(12) United States Patent
Ong

(10) Patent No.: US 8,681,294 B2
(45) Date of Patent: Mar. 25, 2014

(54) OPTICAL COMPENSATION FILM FOR LCD VIEWING ANGLES REDUCTION

(75) Inventor: Hiap L. Ong, Warren, NJ (US)

(73) Assignee: Hiap L. Ong & Kyoritsu Optronics Co., Ltd. (TW)

( * ) Notice: Subject to any disclaimer, the term of this patent is extended or adjusted under 35 U.S.C. 154(b) by 946 days.

(21) Appl. No.: 12/629,878

(22) Filed: Dec. 2, 2009

(65) Prior Publication Data

US 2010/0208174 A1 Aug. 19, 2010

Related U.S. Application Data

(60) Provisional application No. 61/119,140, filed on Dec. 2, 2008.

(51) Int. Cl.
*G02F 1/1343* (2006.01)
*G02F 1/1335* (2006.01)
*G02F 1/1347* (2006.01)

(52) U.S. Cl.
USPC ............... 349/96; 349/61; 349/74; 349/76; 349/141

(58) Field of Classification Search
USPC ................... 349/96, 61, 74–76, 141
See application file for complete search history.

(56) References Cited

U.S. PATENT DOCUMENTS

| 7,400,367 B2 * | 7/2008 | Matsushima | 349/76 |
| 7,705,933 B2 * | 4/2010 | Matsushima | 349/75 |
| 2005/0068480 A1 * | 3/2005 | Hiyama et al. | 349/119 |
| 2006/0176422 A1 * | 8/2006 | Jeng et al. | 349/96 |
| 2007/0195226 A1 * | 8/2007 | Aminaka et al. | 349/96 |

* cited by examiner

*Primary Examiner* — Huyen Ngo
(74) *Attorney, Agent, or Firm* — Silicon Valley Patent Group, LLP.; Edward S. Mao

(57) ABSTRACT

Displays having narrow viewing angles that can be fabricated using fabrication facilities geared toward wide angle displays are described. In one display, a narrow viewing angle optical film is placed between the LCD panel and the polarizers. The narrow viewing angel optical films have a vertically orientated optical axis and a positive birefringence.

8 Claims, 3 Drawing Sheets

OPTICAL COMPENSATION FILM FOR LCD VIEWING ANGLES REDUCTION

RELATED APPLICATIONS

The present application claims the benefit of U.S. Provisional Patent Application Ser. No. 61/119,140, entitled "Novel Optical Compensation Film for LCD Viewing Angles Reduction", by Hiap L. Ong, filed Dec. 2, 2008, and is incorporated herein in its entirety by reference.

BACKGROUND OF THE INVENTION

1. Field of the Invention

The present invention relates to liquid crystal displays (LCDs). More specifically, the present invention relates to viewing angle reduction for Liquid Crystal Displays.

2. Discussion of Related Art

Liquid crystal displays (LCDs), which were first used for simple monochrome displays, such as calculators and digital watches, have become the dominant display technology. LCDs are used routinely in place of cathode ray tubes (CRTs) for both computer displays and television displays. Various drawbacks of LCDs have been overcome to improve the quality of LCDs. For example, active matrix displays, which have largely replaced passive matrix displays, reduce ghosting and improve resolution, color gradation, viewing angle, contrast ratios, and response time as compared to passive matrix displays.

FIGS. 1(a)-1(b) illustrate the basic functionality of a pixel of a vertical alignment LCD 100. For clarity, the LCD of FIG. 1 uses only a single domain. Furthermore, for clarity, the LCD of FIG. 1 is described in terms of gray scale operation.

LCD 100 has a first polarizer 105, a first optical compensation film 107, a first substrate 110, a first electrode 120, a first alignment layer 125, liquid crystals 130, a second alignment layer 140, a second electrode 145, a second substrate 150, a second optical compensation film 152, and a second polarizer 155. Generally, first substrate 110 and second substrate 150 are made of a transparent glass. First electrode 120 and second electrode 145 are made of a transparent conductive material such as ITO (Indium Tin Oxide). First alignment layer 125 and second alignment layer 140, which are typically made of a polyimide (PI) layer, align liquid crystals 130 vertically (or with a small pre-tilt angle) in a resting state. In operation, a light source (not shown) sends light from beneath first polarizer 105, which is attached to first substrate 110. First polarizer 105 is generally polarized in a first direction and second polarizer 155, which is attached to second substrate 150, is polarized perpendicularly to first polarizer 105. Thus, light from the light source would not pass through both first polarizer 105 and second polarizer 155 unless the light polarization were to be rotated by 90 degrees between first polarizer 105 and second polarizer 155. For clarity, very few liquid crystals are shown. In actual displays, liquid crystals are rod like molecules, which are approximately 5 angstroms in diameter and 20-25 angstroms in length. Thus, there are over 10 million liquid crystal molecules in a pixel that is 100 µm width by 300 µm length by 3 µm height.

In FIG. 1(a), liquid crystals 130 are vertically aligned. In the vertical alignment, liquid crystals 130 would not rotate light polarization from the light source. Thus, light from the light source would not pass through LCD 100; therefore, LCD 100 gives a completely optical black state and a very high contrast ratio for all color and all cell gaps. However, as illustrated in FIG. 1(b), when an electric field is applied between first electrode 120 and second electrode 145, liquid crystals 130 reorientate to a tilted position. Liquid crystals in the tilted position rotate the polarization of the polarized light coming through first polarizer 105 by ninety degrees so that the light can then pass through second polarizer 155. The amount of tilting, which controls the amount of light passing through the LCD (i.e., brightness of the pixel), is proportional to the strength of the electric field. Generally, a single thin-film-transistor (TFT) is used for each pixel. However for color displays, a separate TFT is used for each color component (typically, Red, Green, and Blue)

The viewing angle of LCD 100 is enhanced by optical compensation film 107 and 152. Specifically, the optical birefringence of liquid crystals 130 is positive because of the vertical orientation of liquid crystals 130 in the optical black state. This when, optical compensation films 107 and 152, have a vertically orientated optical axis and a negative birefringence, optical compensation films 107 and 152 compensates the oblique angle birefringence under crossed polarizer geometry. Furthermore, the on-axis optical transmission and contrast ratio for LCD 100 would not be reduced.

Additional LCD techniques to improve viewing angle include having multiple domains of liquid crystals. These types of displays are generally called Multi-domain vertical alignment liquid crystal displays (MVA LCDs). Optical compensation films are also used with MVA LCDs to further enhance the viewing angles.

However in many applications, a wide viewing angle is not desired. For example, in crowded areas, having a small viewing angle provides greater privacy to the user of the display as well as reducing disturbance to nearby people. Hence there is a need for a novel system or method to reduce the viewing angle of LCDs in a cost effective manner.

SUMMARY

Accordingly, the present invention provides low cost methods to fabricate narrow the viewing angle liquid crystal displays. Generally, the present invention uses an optical compensation film that narrows the viewing angle of the display.

In one embodiment of the present invention, a LCD display has an LCD panel, a top narrow viewing angle optical film above the LCD panel, and a top polarizer above the top narrow viewing angle optical film. The display has a viewing angle that is smaller than the viewing angle of the LCD panel due to the top narrow viewing angle optical film. The top narrow viewing angle optical film has a vertically orientated optical axis and a positive birefringence. To maintain symmetrical viewing angle property, a bottom narrow viewing angle optical film can be placed between the LCD panel and a bottom polarizer.

In another embodiment of the present invention, a LCD display has an LCD panel and a top narrow viewing angle optical polarizer above the LCD panel. The display has a viewing angle that is smaller than the viewing angle of the LCD panel due to the top narrow viewing angle polarizer. The top narrow viewing angle polarizer has a vertically orientated optical axis and a positive birefringence. To maintain symmetrical viewing angle property, a bottom narrow viewing angle polarizer placed below LCD panel. Otherwise a normal polarizer can be used.

The present invention will be more fully understood in view of the following description and drawings.

DETAILED DESCRIPTION

As explained above, in general LCD technology has been geared to improving viewing angle. However, some situations require displays with narrow viewing angles. Due to the large costs of building fabrication facilities for displays, a low cost method of producing narrow viewing angle displays that can be easily manufactured using the same fabrication facilities as the more common wide viewing angle displays is needed to make narrow viewing angle displays.

In accordance with one embodiment of the present invention, a narrow viewing angle optical film has a vertically orientated axis and a positive birefringence. Under cross polarizer geometry the narrow viewing angle optical film reduces viewing angle with no change on the on-axis optical transmission and contrast ratio. The viewing angle reduction is achieved by the enlargement of the optical birefringence for the oblique viewing angles. Thus for LCD applications, the narrow viewing angle optical film is placed between the polarizer and LC cell. A narrow viewing angle optical film has been manufactured by Japan Nitto Denko Corporation for Dr. Hiap L. Ong with the properties of vertically orientated axis and a positive birefringence.

Figure 1B:
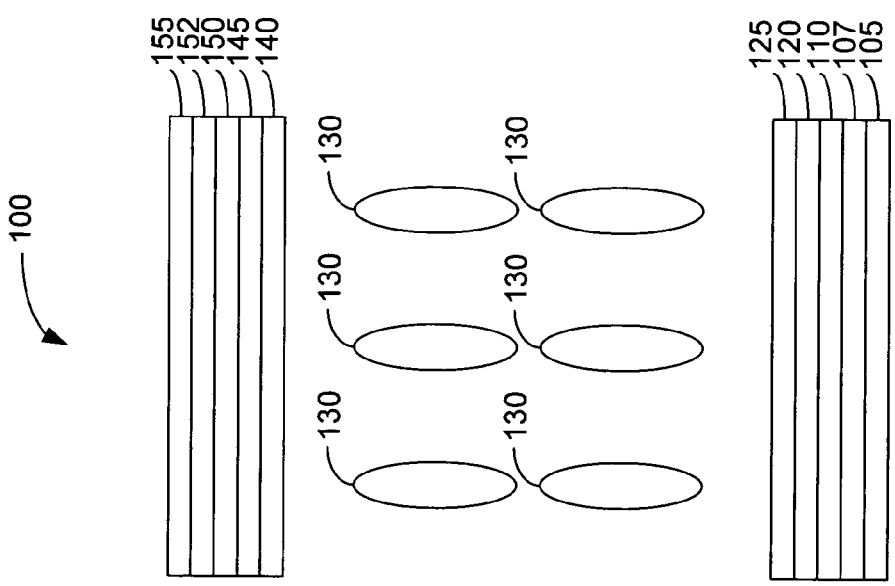
FIGS. 1(a)-1(b) are two illustrations of a pixel of a conventional single domain vertical alignment LCD.
Figure 1A:
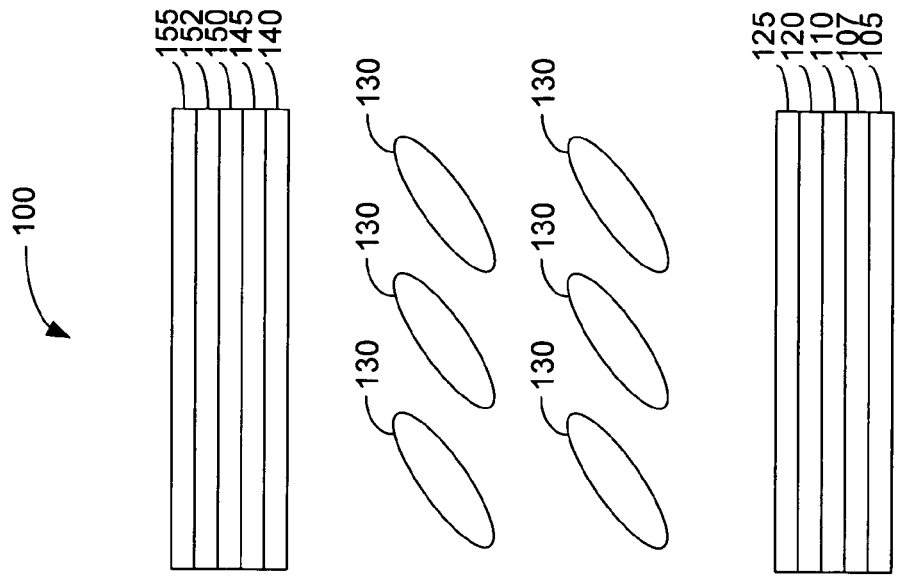
Figure 2:
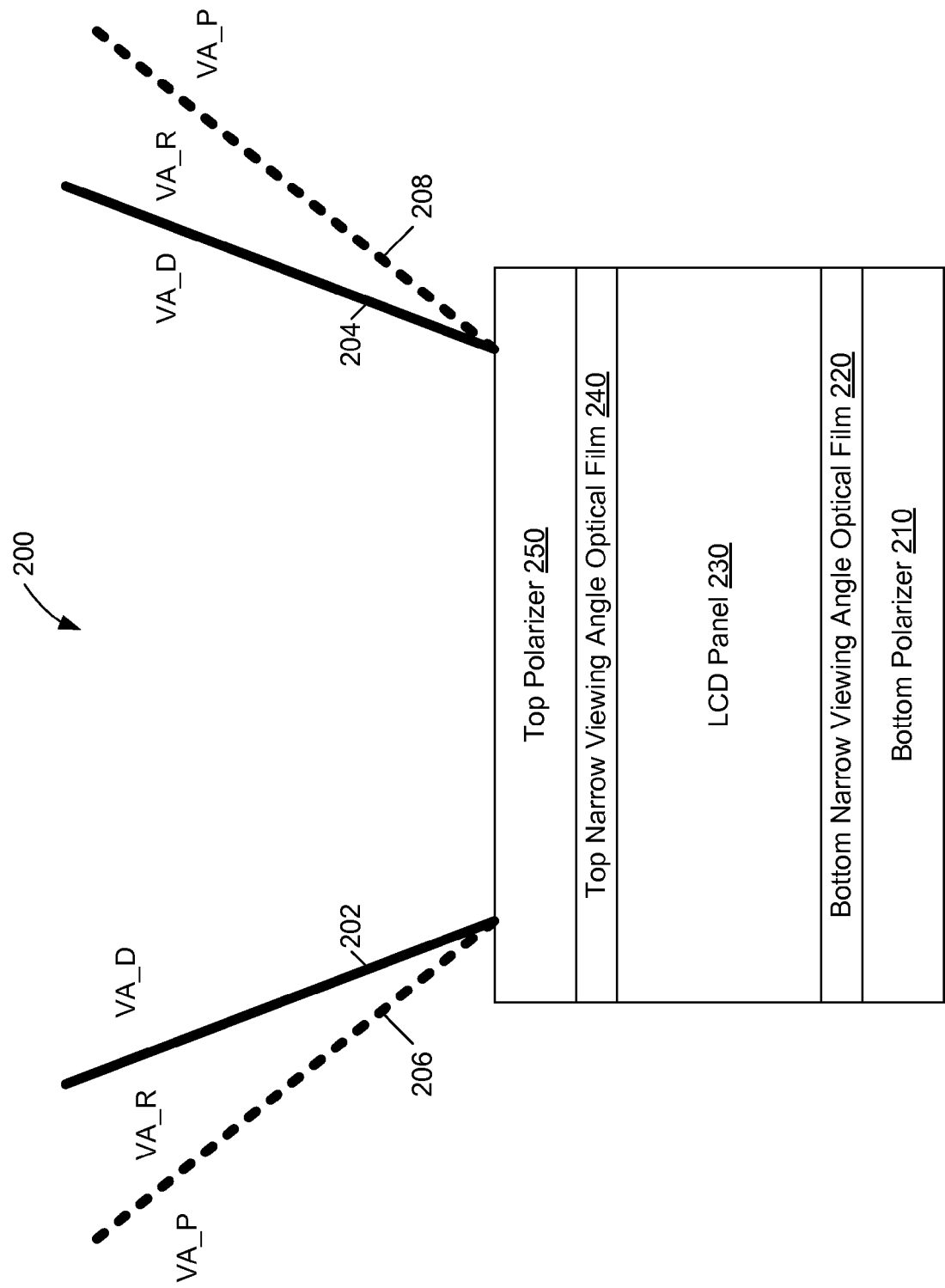
FIG. 2 is an illustration of a LCD display in accordance with one embodiment of the present invention.

FIG. 2 illustrates the use of the narrow viewing angle optical film using a simplified diagram of an LCD display. Specifically, FIG. 2 shows a LCD display 200 having a bottom polarizer 210, a bottom narrow viewing angle optical film 220, a LCD panel 230, a top narrow viewing angle optical film 240 and a top Polarizer 250. LCD panel 230 includes the liquid crystals, the alignment layers, the electrodes and other components as described above with respect to FIGS. 1(a) and 1(b). Furthermore, LCD panel 230 could be any type of LCD panel such as MVA, twisted nematics, electrically controlled birefringence, in-plane switching, fringe field switching, advanced fringe field switching, and optically compensated bend, etc.

Bottom narrow viewing angle optical film 220 is placed between the bottom of LCD panel 230 and bottom polarizer 210. Top narrow viewing angle optical film 240 is placed between the top of LCD panel 230 and top polarizer 250. The viewing angle of the LCD display 200 (VA_D) is illustrated by solid lines 202 and 204. The viewing angle of LCD panel 230 is illustrated by dotted lines 206 and 208. The viewing angle reduction VA_R is caused by bottom narrow viewing optical film 220 and top narrow viewing angle optical film 240.

The viewing angle reduction VA_R is proportional to the total optical birefringence thickness of the compensation film. Specifically, viewing angle reduction VA_R is equal to the difference between the extra-ordinary and the ordinary refractive index of the narrow viewing angle optical film multiplied by the sum of the thickness of top narrow viewing angle optical film 240 and the thickness of bottom narrow viewing angle optical film 210. Equation EQ1 provides the viewing angle reduction VA_R in equation form.

$$VA\_R = (N\_e - N\_o) \times (T\_top + T\_bottom) \quad (EQ1)$$

where, N_e is the extra-ordinary refractive index of the narrow viewing angle optical film, N_o is the ordinary refractive index of the narrow viewing angle optical film, T_top is the thickness of the top narrow viewing angle optical film and T_bottom is the thickness of the bottom narrow viewing angle optical film.

The use of both a top narrow viewing angle optical film and a bottom narrow viewing angle optical film is to preserve symmetrical viewing property between viewing zones. Generally to maximize symmetry top narrow viewing angle optical film and bottom narrow viewing angle optical film should be identical. However, if symmetrical viewing angle property between viewing zones is not important, the bottom narrow viewing angle optical film could be omitted to reduce cost.

Figure 3:
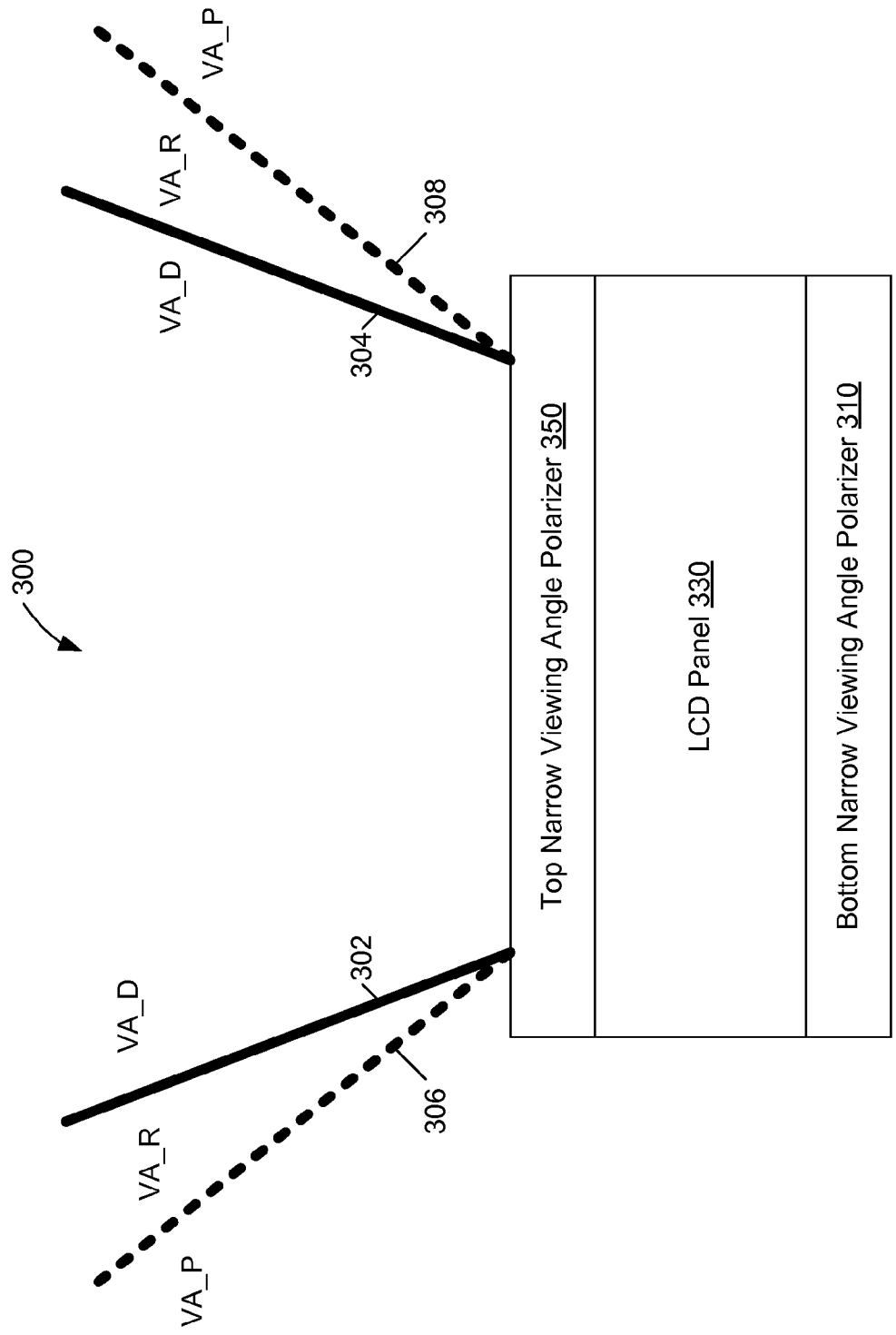
FIG. 3 is an illustration of a LCD display in accordance with one embodiment of the present invention.

FIG. 3 illustrates another embodiment of the present invention. In FIG. 3 a LCD display 300 uses narrow viewing angle polarizers, which are formed by combining the narrow viewing angle optical film with a polarizer. Specifically, display 300 includes an LCD panel 330, a top narrow viewing angle polarizer 350 attached to the top of LCD panel 330 and a bottom narrow viewing angle polarizer 310 attached to the bottom of LCD pane 330. Conventional polarizer attachment processes can be used to attach top narrow viewing angle polarizer 350 and bottom narrow viewing angle polarizer 310 to LCD panel 330.

The viewing angle of LCD display 300 (VA_D) is illustrated by solid lines 302 and 304. The viewing angle of LCD panel 330 is illustrated by dotted lines 306 and 308. The viewing angle reduction VA_R is caused by bottom narrow viewing polarizer 310 and top narrow viewing angle polarizer 350.

In a particular embodiment of the present invention a narrow viewing angle polarizer includes a triacetle cellulose, a polyvinyle alcohol layer, a narrow viewing optical film layer, and adhesive material. The triacetyl cellulose layer could be surface treated to have a hard coat, anti-glare, and/or anti-reflection properties.

Using the structure and methods disclosed in this invention, a display with a narrow viewing angle display can be manufactured using fabrication facilities geared towards wide viewing angle displays. Specifically, the LCD panel, including the liquid crystals, the alignment layers, the electrodes, and the substrates can be made conventionally. Furthermore, the narrow viewing angle polarizers or the narrow viewing angle optical films can be attached to the LCD panel using conventional techniques. Therefore, the principles of the present invention are applicable to all type of Liquid Crystal Displays, including the conventional twisted nematic LCDs, vertical alignment LCDs, multi-domain vertical alignment LCDs, in-plane switching LCDs, fringe field switching, advanced fringe field switching, supertwisted nematic LCDs, electrically controlled birefringence LCDs, optically controlled birefringence LCD, optically compensated bend LCD, cholesteric, smectic and bistable LCDs. In addition the present invention is also applicable to monochromatic display with only one color component, two color components, three color components and four color components (typically red, green, blue and white), and other multiple color components.

In the various embodiments of the present invention, novel structures and methods have been described for creating achieving displays with narrow viewing angles. The various embodiments of the structures and methods of this invention that are described above are illustrative only of the principles of this invention and are not intended to limit the scope of the invention to the particular embodiments described. For example, in view of this disclosure those skilled in the art can define other polarizers, optical films, narrow viewing optical films, narrow viewing angle polarizers, LCD panels, alignment layers, electrodes, substrates, films, and so forth, and use these alternative features to create a method, or system according to the principles of this invention. Thus, the invention is limited only by the following claims.

What is claimed is:

1. A display comprising:
   a LCD panel;
   a top narrow viewing angle optical film above the LCD panel, wherein the top narrow viewing angle optical film has a positive birefringence; and
   a top polarizer above the top narrow viewing angle optical film.

2. The display of claim 1, wherein a display viewing angle of the display is less than a panel viewing angle of the LCD panel.

3. The display of claim 1, further comprising bottom narrow viewing angle optical film below the LCD panel.

4. The display of claim 3, further comprising a bottom polarizer below the bottom narrow viewing angle optical film.

5. The display of claim 3, wherein the top narrow viewing angle optical film and the bottom narrow viewing angle optical film are identical.

6. The display of claim 1, wherein the top narrow viewing angle optical film has a vertically orientated optical axis.

7. The display of claim 1, wherein the LCD panel is a twisted nematic LCD panel.

8. The display of claim 1, wherein the LCD panel is a multi-domain vertical alignment LCD panel.

* * * * *